United States Patent
Chen et al.

(10) Patent No.: US 7,986,421 B2
(45) Date of Patent: Jul. 26, 2011

(54) METHOD AND SYSTEM FOR REAL-TIME END-USER STATUS AND QUALITY MONITORING OF PRINTING OPERATIONS

(75) Inventors: Yen-Fu Chen, Austin, TX (US); Randolph M. Forlenza, Austin, TX (US); John P. Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/154,210

(22) Filed: May 21, 2008

(65) Prior Publication Data

US 2008/0225325 A1    Sep. 18, 2008

Related U.S. Application Data

(62) Division of application No. 11/035,166, filed on Jan. 13, 2005, now abandoned.

(51) Int. Cl.
    *G06K 15/00*      (2006.01)
(52) U.S. Cl. ...... 358/1.14; 358/1.15; 358/504; 358/406; 382/112
(58) Field of Classification Search ............ 358/1.15, 358/1.14, 504, 406; 382/112
See application file for complete search history.

(56) References Cited

U.S. PATENT DOCUMENTS

| | | | |
|---|---|---|---|
| 5,535,313 A * | 7/1996 | Schwab ................ 345/418 |
| 6,108,492 A | 8/2000 | Miyachi | |
| 6,419,342 B1 | 7/2002 | Bronswijk et al. | |
| 6,504,625 B1 | 1/2003 | Amero et al. | |
| 6,523,920 B2 | 2/2003 | Wade et al. | |
| 6,559,965 B1 | 5/2003 | Simpson et al. | |
| 6,561,615 B2 | 5/2003 | Okawa et al. | |
| 7,148,995 B2 * | 12/2006 | Martinez et al. ............. 358/1.9 |
| 2001/0016054 A1 * | 8/2001 | Banker et al. ............. 382/112 |
| 2002/0181016 A1 | 12/2002 | Al-Kazily et al. | |
| 2003/0020945 A1 * | 1/2003 | Lopez et al. ............. 358/1.15 |
| 2004/0114157 A1 * | 6/2004 | Linder et al. ............. 358/1.9 |
| 2005/0088688 A1 * | 4/2005 | Noda ..................... 358/1.15 |
| 2005/0141030 A1 * | 6/2005 | Tuchitoi et al. ............. 358/1.16 |
| 2006/0126133 A1 * | 6/2006 | Marquez ................... 358/504 |
| 2006/0193017 A1 * | 8/2006 | Zuber ..................... 358/504 |
| 2006/0238780 A1 * | 10/2006 | Dennison ................. 358/1.9 |

\* cited by examiner

*Primary Examiner* — David K Moore
*Assistant Examiner* — Benjamin O Dulaney
(74) *Attorney, Agent, or Firm* — Schmeiser, Olsen & Watts; Mark C. Vallone

(57) ABSTRACT

A user connected to a remote printer can choose to activate a print-monitoring feature of the printer as part of the submitted print job. As the job begins to print, the output of the printer is monitored for print quality. If an event occurs during the print job that affects the print job, the user receives real-time notification of the status of the print job. The events can be printer related such as paper jam or print job related such as poor print quality. The user can have an option of reviewing various parts of the print job during the printing process. There can also be an automatic print job out evaluation. If the user accepts the print quality, the printer will continue printing the job. If the user is not satisfied with the print quality, the job is halted and sent to a temporary print buffer. While the job is halted, adjustments are made to either the printer to improve print quality or to the print parameters of the print job to improve print quality.

12 Claims, 6 Drawing Sheets

METHOD AND SYSTEM FOR REAL-TIME END-USER STATUS AND QUALITY MONITORING OF PRINTING OPERATIONS

RELATED APPLICATION

This application is a continuation application of, and claiming priority to, Ser. No. 11/035,166, filed Jan. 13, 2005 now abandoned.

FIELD OF THE INVENTION

The present invention relates to a method and system for analyzing the quality of a print job and in particular to a method and system for analyzing the quality of a print job executing on a printer that is in a remote location with regard to the user initiating the print job. The method of the present invention notifies the user of the print quality prior to the completion of the print job and gives the user the opportunity to modify or terminate the print job.

BACKGROUND OF THE INVENTION

A printer is a peripheral device connected to a computer that prints information from the computer onto a tangible medium, usually paper. In many configurations, the computer is connected directly to the computer in one location. Both the computer and the printer are in close proximity to each other and to the user. However, many other systems comprise printers that are connected to but located far from the computer. In these configurations, a computer can be shared on a network connected to a print server. Also, a printer can directly connect to the network by including a network interface card or the network interface in the printer, which allows the printer to run its own print server software and function as a regular network node. In a typical Windows environment, for example, the network printer is a one-way printer. For a one-way printer, the only communication path is from the host computer to the printer without any ability for the printer to notify the host computer of the job status such as whether the print job has been successfully completed.

Many corporations have printing networks in which one can print from anywhere to a remote printer. These networks allow a person to take advantage of the remote printing from home, especially if printing large documents, so that one can just pick them up at a later time. Although many print jobs are performed via a computer network, remote printing can leave the user in the dark with respect to its actual print status. However, there can be problems when the network printer is unable to complete the print job due to cases such as:
  A paper jam
  Unintended enormous document is being printed by someone else (requires calling helpdesk to delete the job, users do not have authority)
  Printer goes off line and looses communication after print job started
  Document printed out but after the first page the toner ink becomes low enough to degrade the print quality (barely readable) but passes the printer's low ink detection
  Document printed but toner is not evenly distributed or unintentional lines exist causing poor print quality.
From this, one can understand how an entire print job could have been sent to the printer, stored in the printer's buffer, and then disappear from the print job list. The user believes the print job is actually completed when in fact, it may be in limbo or completed with the poor quality.

From a remote employee's perspective, these unexpected situations, errors, and essential information should have been communicated so the user who initiated the print job can take the appropriate action and not waste time (e.g., walking back and forth between office to printing room), and can perhaps save a trip from home to the office. In fact, the same notification should be sent to a printer support group helpdesk personnel so they can quickly respond and fix the problem. One reason why the user is notified of the print status in remote printing jobs is that the communication between the computer and the printer is a one-way communication from the computer to the printer. Most printers communicate problems to users via visual light displays on the actual printer that will illuminate to indicate some sort of problem with a print job. However, this information is known only to those in close enough proximity to view the printer LEDs. In addition, some personal computer systems with direct connections between the computer and the printer will alert a user via the terminal to some but not all printing problems.

Recently developed software programs have become available allowing the host systems or computers to communicate interactively with the network printers. With this capability, host resident printing software can accomplish tasks such as determining the configuration of the device automatically and reporting the status of a print job back to the submitting host or client system. U.S. Pat. No. 6,559,965 to Simpson et al. describes a method for establishing two-way communications between a host system and a device such as a computer printer.

In addition to the inability to inform the user of the status of a print job, many times the print job completely executes as intended. However, when the user arrives to retrieve the job, the user notices that the print quality is well below acceptable standards. This substandard print quality could be the result of the toner ink cartridge becoming low enough to degrade the print quality of the job. U.S. Pat. No. 6,523,920 to Wade et al., seeks to address this issue. This invention describes a method of improving print quality in a thermal ink jet printer by mounting a combination pen and optical scanner head on a carriage of a printer for reciprocation along a scan axis. A sheet of print media is propelled through the printer along a paper axis. A predetermined test pattern of dots of different ink colors is printed onto the print media using the combination pen and optical scanner head or another pen also mounted on the carriage. Predetermined dot position, dot size and/or spectral information is compiled by scanning the location, size and color of the dots of the test pattern using the combination pen and optical scanner head. Predetermined ink jet firing signals are corrected in accordance with pre-programmed parameters based on the compiled dot position, dot size and/or spectral information in order to improve print quality.

Although, there have been attempts to address various problems related to printing jobs from locations that are remote to the user, there still remains a need for a method, apparatus and system that can provide an efficient means to notify user of the status and quality of a print job at a remote location.

SUMMARY OF THE INVENTION

It is an objective of the present invention to provide a method and system that can monitor the status of a print job during the execution of the job and notify the user of any event that will adversely affect the completion of the print job.

It is a second objective of the present invention to provide a method and system that can monitor the quality of a print job and notify the initiator of degradations in the quality of the print job prior to the completion of the print job.

It is a third objective of the present invention to provide a method by which the initiator of a print job could modify or terminate the print job when notified of poor print quality.

It is a fourth objective of the present invention to provide a means on the printer that can analyze print quality and detect poor print quality during the execution of a printing job.

The present invention describes print quality monitoring printer having scanning device (attachable or as part of the printer) with a pluggable software module for network printers to perform quality measurements and analysis on printed materials, which can send a notification to the user/helpdesk enabling real-time status tracking of a print job. This printer will detect printer errors, and more importantly, any events relating to and affecting print quality. The ability to detect these events during printing allows a user or helpdesk person the opportunity to cancel a job upon detecting these types of errors and thereby saving paper and printing time. This invention also provides a better solution than installing a web cam in the printer room to watch over print jobs.

In the method of the present invention, the user sends the job to the remote printer queue. As an option, the user can choose to activate the print-monitoring feature of the printer as part of the submitted print job. As the job begins to print, the output of the printer is monitored print quality. At a designated point, for example after the first page, the user is notified of the print quality. This notification can vary and can be things such as message from the printer or an image of the first printed page. If the user accepts the print quality, the printer will continue printing the job. If the user is not satisfied with the print quality, the job can be halted and sent to a temporary print buffer. If the job is halted, adjustments can be made to either the printer to improve print quality or to the print parameters of the print job to improve print quality.

In addition to monitoring the print quality of a job, when another event occurs that affects the print job such as a paper jam, a notification is sent to the user informing the user of the print status. Again, the user or a computer operator at a location closer than the user can attend to the printer and restore printer functioning.

DETAILED DESCRIPTION OF THE INVENTION

Figure 2:
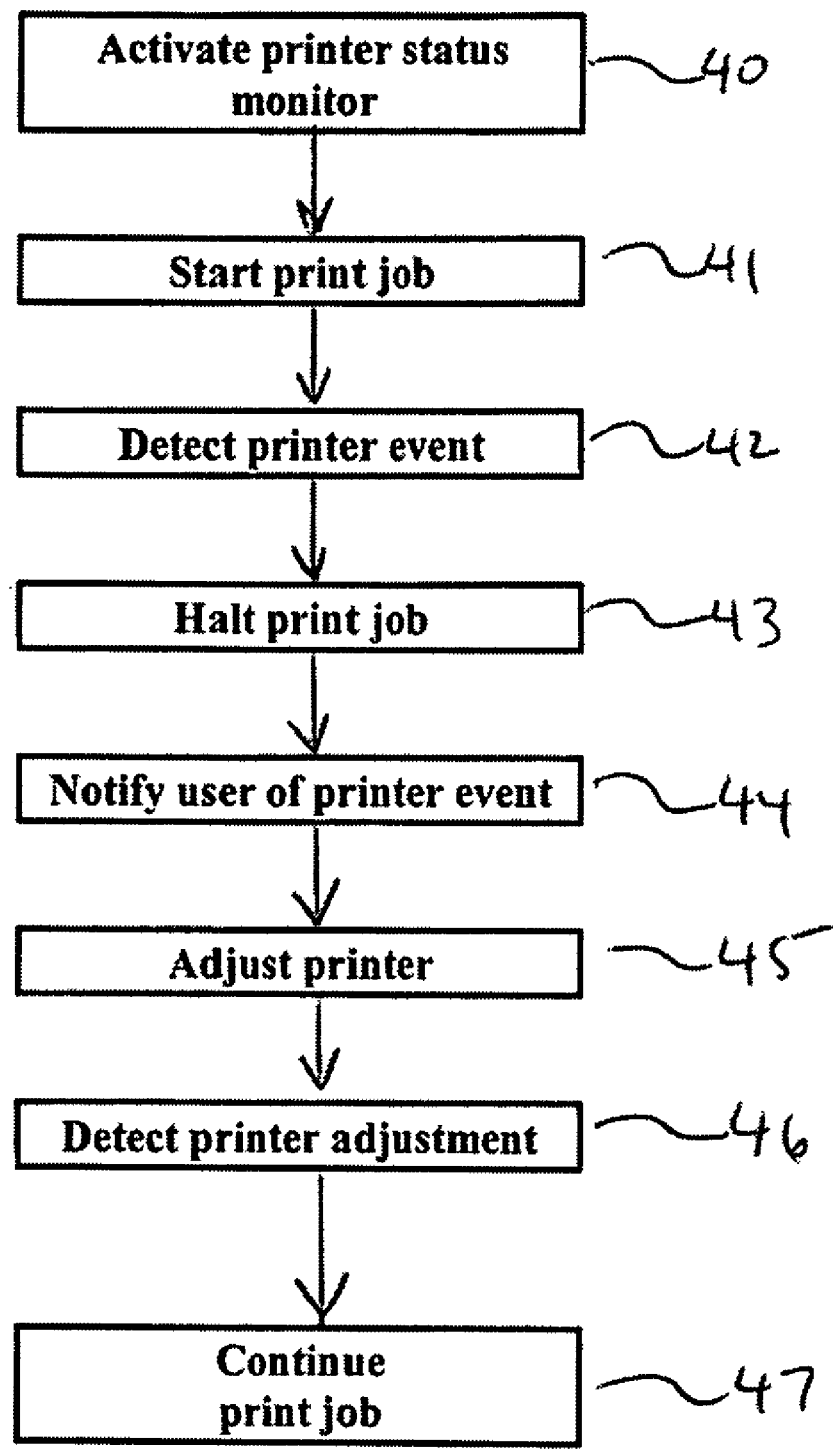
FIG. 2 is a flow diagram illustrating the steps in a general implementation of the method of the present invention.

The connection between a user and a remote printer device can be implemented through various network configurations such as a global computer network environment. With reference to FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 1:
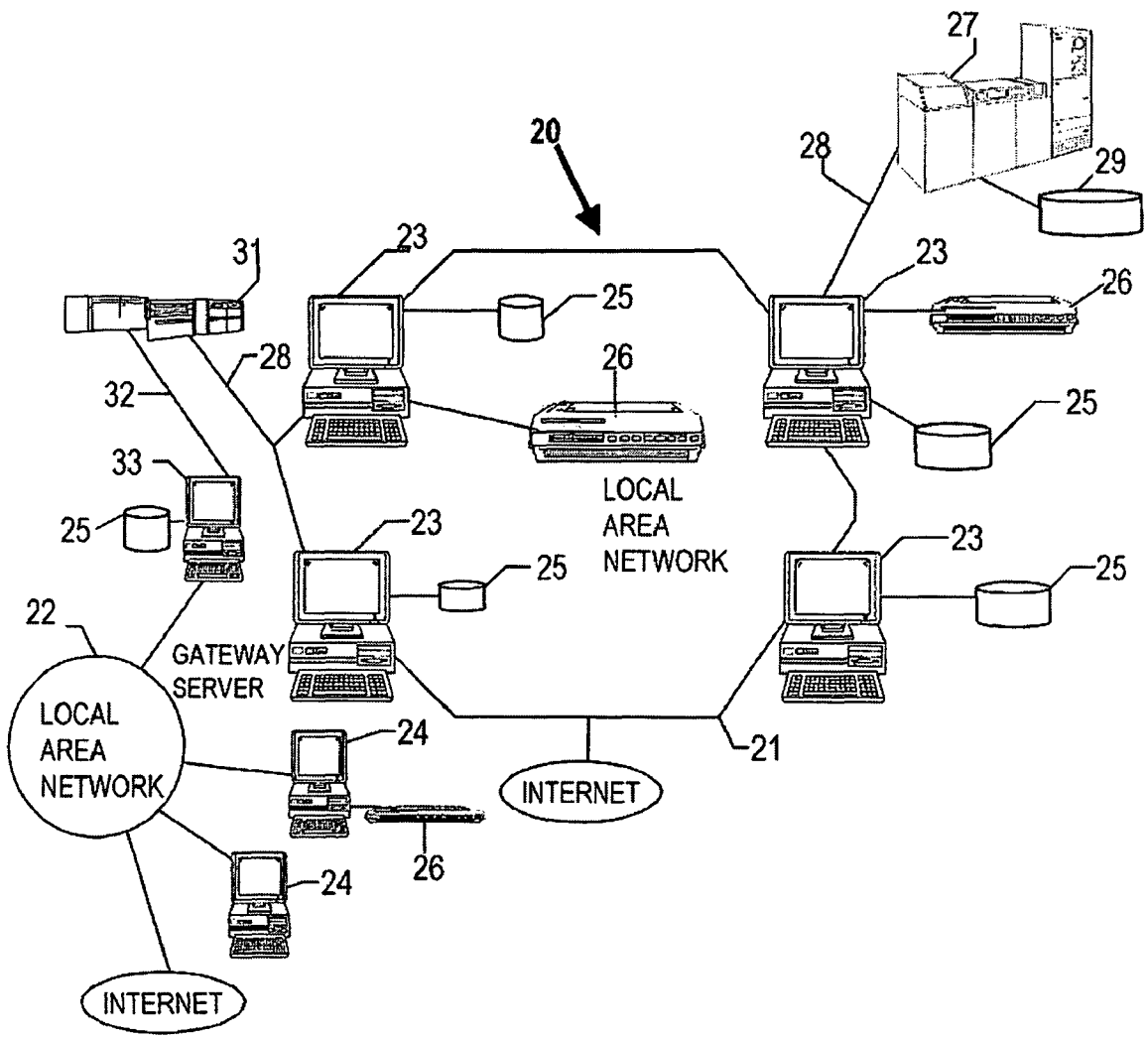
FIG. 1 is a diagram of a computer network over which two-way communications can occur between a user and a remote printer device in accordance with the present invention.

Still referring to FIG. 1, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

With regard to the actual printer device, the network printer includes a new scanning device with pluggable software. The scanning device can be clipped on to a printer such that print outs are scanned as they exit the printer. The scanning device could be made as part of the printer. The printer can also have trays (just like what is seen on a copy machine in a supply room). Basically, this is the printer's ability to separate different sets of printout (from different print jobs). So while waiting for a user who submitted the print job to confirm the quality of printout set number 1, printout set number 2 can proceed without any delay. And when the user decides to continue, the printer will switch back to printout set number 1 and complete it (or completes set number 2 first). Automatically re-orders queue based on classification and if waiting for user's input, such as prompting user to verify the first page's quality by clicking on "good" button so the printer can continue printing. So while waiting, in this method, the printer will begin printing the other jobs until user responds. When the user responds, that just could move to next in the print queue. This multiple print job arrangement can be easily handled, if printer has multiple trays such as on a copy machine, only one tray is required, printer can store separation gap of the printouts in the tray in memory . . . like making multiple copies from one set of documents using a copy machine.

FIG. 2 is a flow diagram illustrating the steps in a general implementation of the method of the present invention. In this process, a print status monitor is initialized, step 40, before the process of printing jobs begins. This status monitor can be an optional feature. In that event, the status monitor would be initialized for a designated job. Step 41 retrieves and begins to print the next job in the print queue. If some event occurs during the printing process, step 42 would detect this event. As mentioned, events can range from a paper jam, to empty paper trays, to poor printer quality. When the monitor detects an event, step can 43 halt the printing process. At this point, step 44 notifies the user of the job of the halted status. The user/help desk can in step 45 adjust the printer as needed to address the problem that triggered the event and its detection by the print monitor. Once the problem causing the event trigger has been resolved, step 46 detects this adjustment at the printer. Step 47 then continues printing the job.

Figure 3:
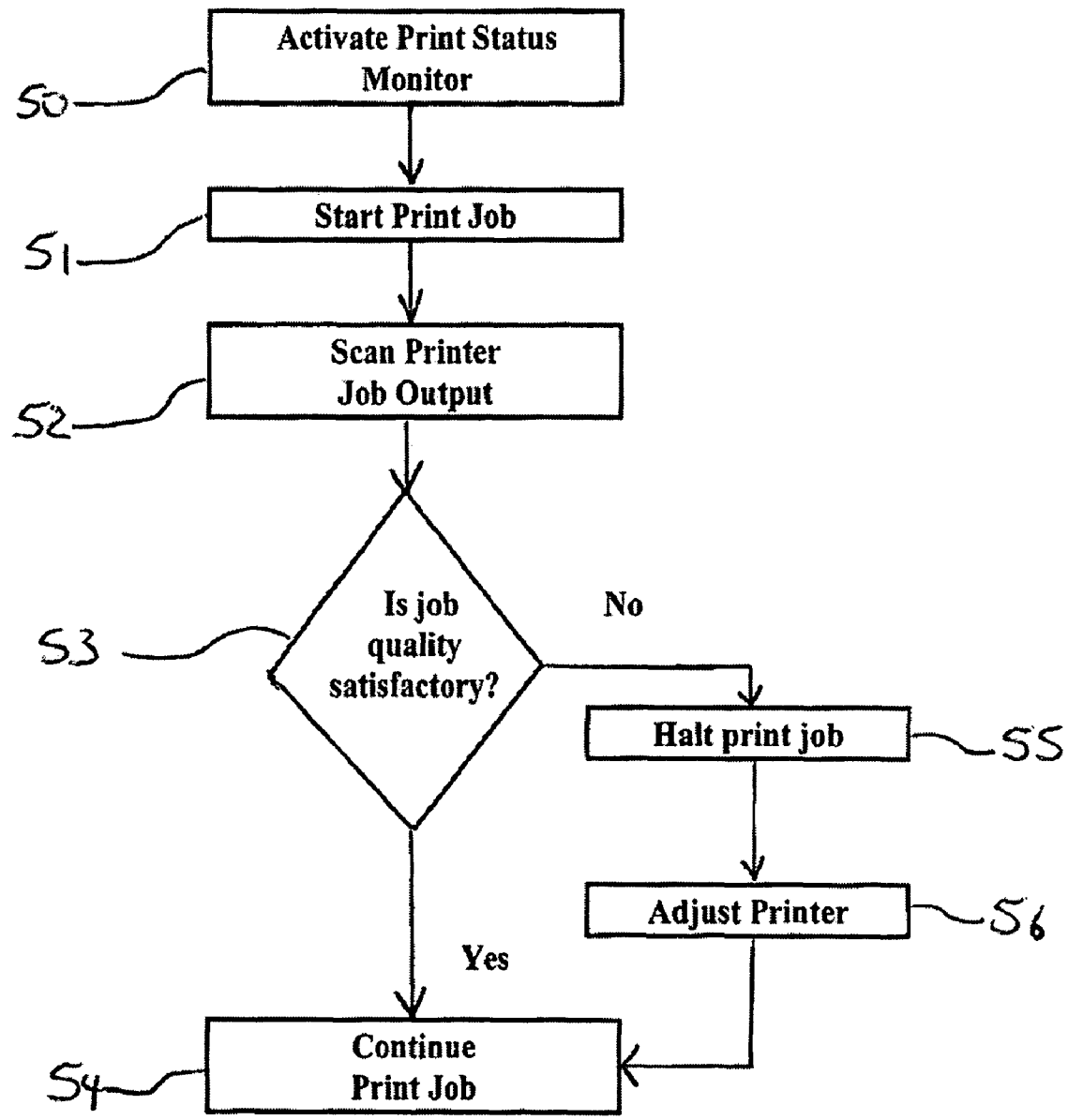
FIG. 3 is a flow diagram illustrating the general steps in an implementation of print quality notification method of the present invention.

FIG. 3 is a flow diagram illustrating the general steps in an implementation of print quality notification method of the present invention. In this embodiment, the printer monitor evaluates the quality of the printer output. Step 50 activates the print monitor and step 51 begins the print job. In this embodiment, step 52 scans the printer output and step 53 evaluates the print quality. In this evaluation process, the contents of the printed document may be compared to some objective print standard, similar to some facsimile machines that monitor line quality of the fax transmissions. U.S. Pat. No. 6,523,920 to Wade et al., describes a means of print quality evaluation. Referring to step 53, if the evaluation of the print quality concludes that the quality is acceptable, the print job continues at step 54. If the evaluation concludes that the print quality is not accessible, step 55 halts the job and sends a notification to the user. At this point, in step 56, the user can come and address the printing problem detected in this process. As mentioned, the problems can range from the printer being out of paper to poor print quality to a paper jam. Once the print problem has been resolved the printing process continues at step 54. Although not shown in FIG. 3, after the resolution of the printing problem and the continuation of the print job at step 54, the process can return to step 52. This return step could be in the event the user desires to have additional quality checks occur at various stages of the printing process. The method illustrated in FIG. 3 can be an embodiment, which is completely automatic without user interaction or can allow for interaction during the process.

Figure 4:
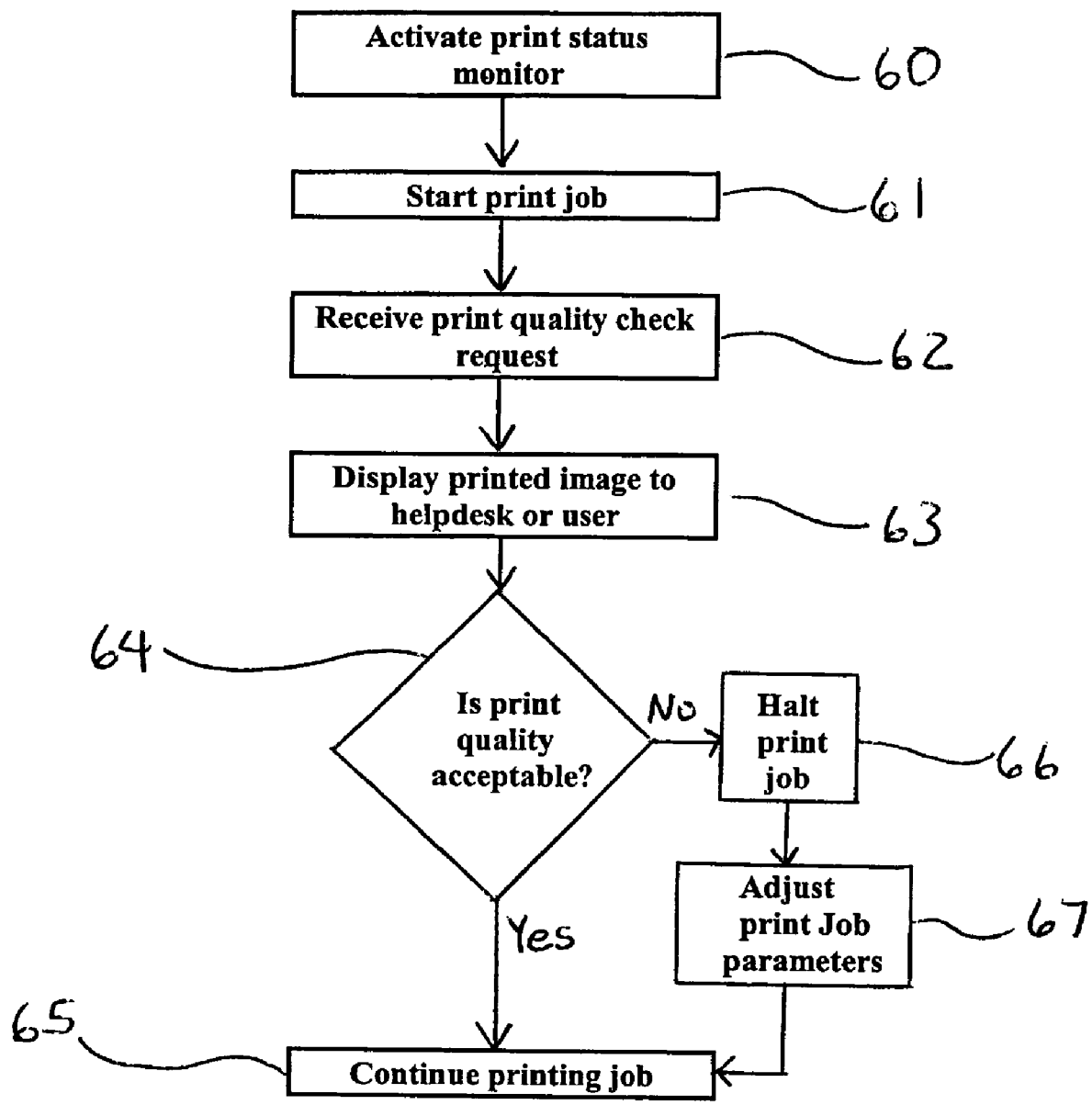
FIG. 4 is a flow diagram illustrating an embodiment of an interactive print quality status verification method of the present invention.

FIG. 4 is a flow diagram illustrating an embodiment of an interactive print quality status verification method of the present invention. As with previously described embodiment, step 60 activates the print status monitor. Step 61 then starts the print job. In step 62, the user can elect to have his/her job evaluated and be notified of all of the results. If the user decides to have their job monitored and reviewed, the user would send a request to the printer. In this example, in response to the user request, step would display a scanned version of a portion of the user's print job in step 63. This portion could vary as desired by the user. Some users may only need one printed page of the print job. Another user may want to view random pages throughout a document. In step 64, there is a determination of whether the present quality is acceptable to the user. If the print quality is acceptable, the print job resumes in step 65. If however, the print quality as a result of the evaluation in step 64 is not acceptable, the process moves to halt the job state in step 66. At this point, step 67, the user or other skilled person can address the problem print job. After the printing problem has been resolved, the print job can continue.

Figure 5:
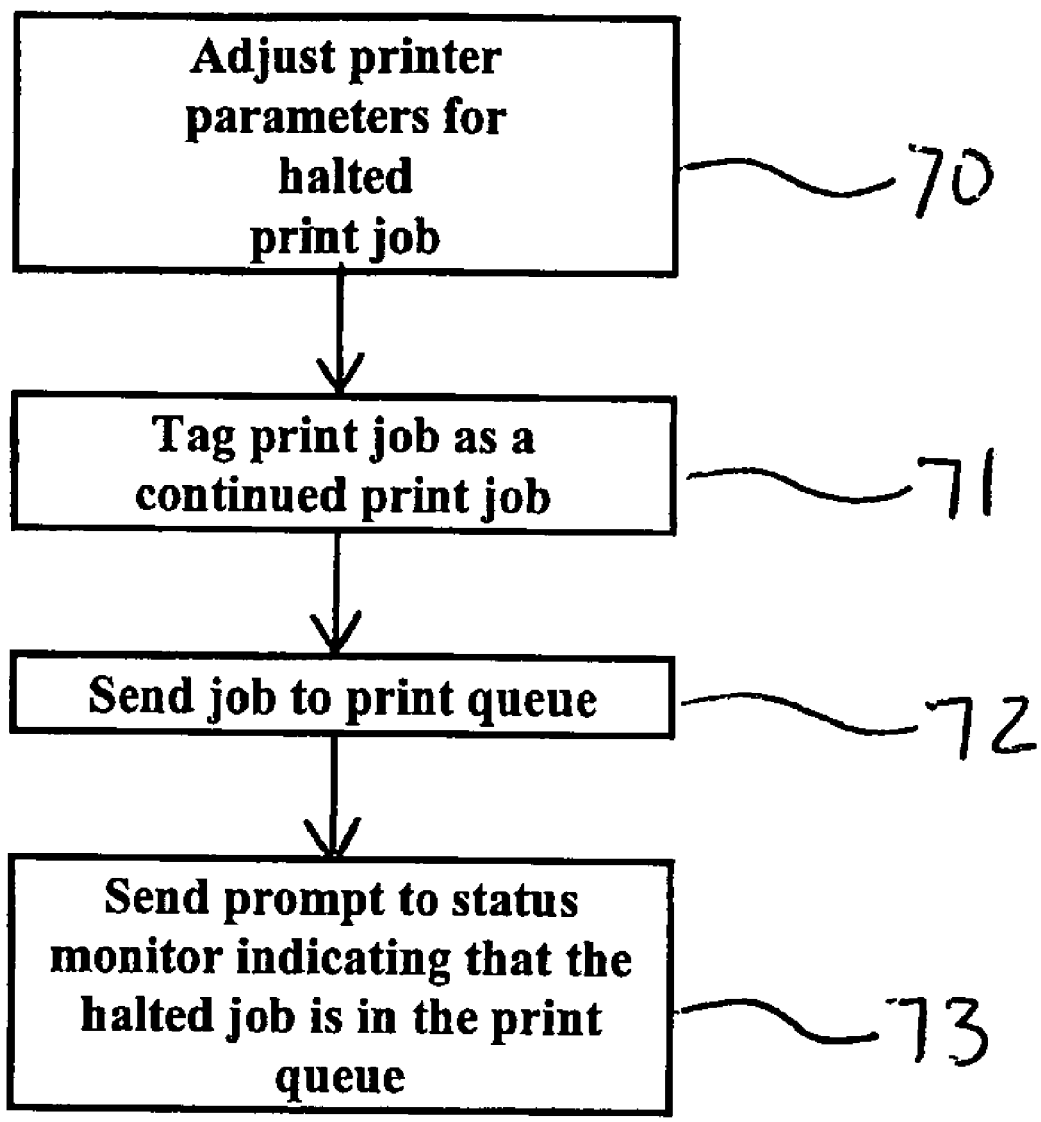
FIG. 5 is a flow diagram illustrating the steps involved in the printer parameter adjustment step of the quality status verification method of FIG. 4 of the present invention.

FIG. 5 illustrates an example of the activities that can be implemented at the parameter adjustment step in FIG. 4. The user can adjust the print parameters for the job, step 70. A simple adjust may be to make the print darker. At the completion of the adjustment, in step 71, the print job is tagged to designate that this job is a continuation of a print job that was previously halted. This tagging feature is important when there are multiple print jobs in the queue. Step 72 sends print job back to the print queue. Once the print job is back in the active queue, step 73 sends a message to the user notifying the user that the previously print job is back in the queue to be executed.

Figure 6:
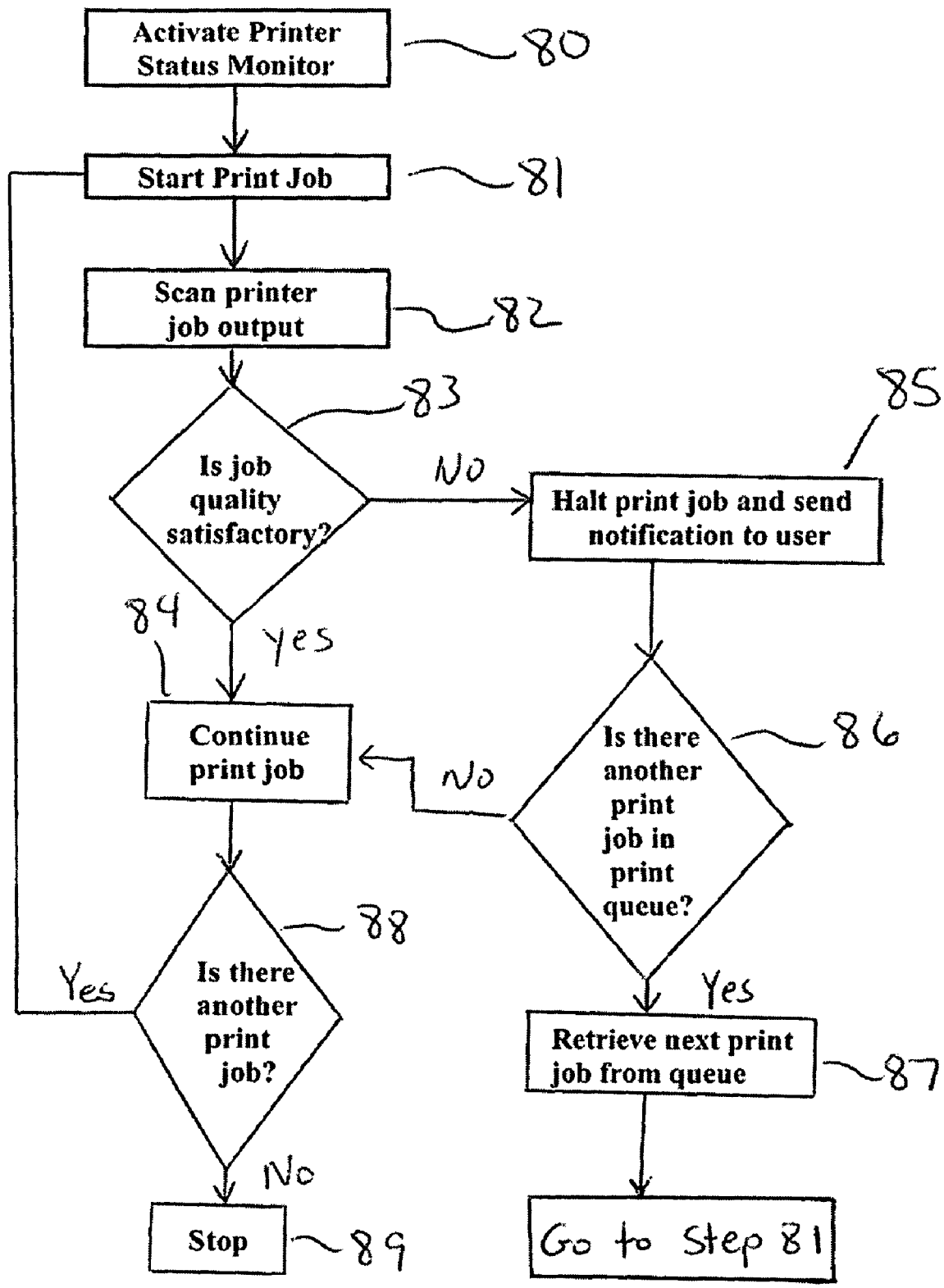
FIG. 6 is a flow diagram illustrating the steps involved in an embodiment of the print quality notification process of the present invention, which comprises multiple print jobs.

FIG. 6 is a flow diagram illustrating the steps involved in an embodiment of the print quality notification process of the present invention, which comprises multiple print jobs. Step 80 activates the printer status monitor. Step 81 starts the printing job. As the job is printing, the output is being scanned in step 82. As previously described, step 83 determines whether the print quality is satisfactory. If the quality is satisfactory, the process moves to step 84. If in step 83, the print quality is not satisfactory, the process moves to step 85, which halts the job and notifies the user of the status of the job. While a job is halted, step 86 determines whether there are other jobs in the queue. If so, step 87 retrieves the next job in the queue and returns to 81. Referring back to step 84, at the completion of the print job, there is a determination as to whether there is another print job in the queue, in step 88. If there is another print job in the queue, that job is retrieved and the process returns to step 81. If no other jobs are in the queue, the process terminates in step 89.

The implementation of the present invention can take place in a variety of embodiments and can include many of the following features and options:

For the software:
- The scan could be done on part or all of a page(s) (e.g., header page, first document page, random, more than one, all).
- The scan could automatically be done for each print out or random print out.
- The scan can be made such that it is only initiated by the user or helpdesk rather than always being done by the printer for every document. This case would allow verification for a particular document but wouldn't catch all problems if it were not initiated for each (or random) printout. It would need to be requested as part of the print job.
- Configurable such as scan every 20 pages or only scan the first 2 seconds, etc.
- Integrated into existing print monitor application so it has access to print information such as queue, number of pages, etc.
- Can be enabled using wireless technology or cable.
- Compatible for all printers
- Selective print job sampling. Once user or helpdesk enables this invention's real-time status tracking and quality monitoring, the software will automatically classify the print job and can therefore put this type of printing on a lower priority queue to avoid delays of normal jobs not needing this service.

If end user initiated, the print queue could be made to automatically re-order print jobs based on this new classification.

The print job could be made to sample without user's input or hold and wait for a user's response.

The specific print job could be made to wait for a user's input, such as prompting the user to verify the first page's quality by clicking on "good" button so that the printer can continue printing. So while waiting, this invention will begin printing other jobs until the user responds, then it will switch back to avoid any delay.

Upon a request to check the print quality:

The status monitor will prompt the user (and helpdesk) to continue or stop the print job. The exception is if it is requested to check always (by the helpdesk) in which case it could just send/store bitmaps of what it scanned for later viewing.

The status monitor would display the scanned image and allow for zoom/panning.

If helpdesk stops a user's job, status of that could also be given to the user.

Another plug-in could be created for a corporation's on-line helpdesk service in opening a ticket if the user is not authorized to interfere with print jobs.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for real-time monitoring of remote printing operations, said method comprising:
    executing a first printing operation on a first print job via a printer, said printer being at a printing location that is remote from an end user submitting the printing request, said executing the first printing operation comprising said printer generating printed output consisting of a plurality of output pages for the first print job, each output page having printed content thereon;
    a scanner coupled to the printer selectively scanning the printed output with selectivity as to the output pages and/or the printed content on the output pages;
    evaluating a result of said selectively scanning with respect to an objective print standard;
    ascertaining from said evaluating that an unsatisfactory print quality of the printed output exists;
    responsive to said ascertaining, halting said executing the first printing operation;
    notifying the end user of said halting;
    responsive to said halting, executing a second printing operation on a second print job via the printer and adjusting print parameters of the first print job to prevent a re-occurrence of the unsatisfactory print quality after said executing the first printing operation is subsequently resumed, wherein said executing the second printing operation and said adjusting print parameters of the first print job are performed concurrently;
    responsive to completion of said adjusting print parameters of the first print job, switching out said executing the second printing operation even though said executing the second printing operation has not been completed; and
    responsive to said switching out said executing the second printing operation, resuming said executing the first printing operation, wherein said resuming said executing the first printing operation comprises tagging the first print job to convey that the first print job had been previously halted.

2. The method of claim 1, wherein the method further comprises randomly selecting pages of the printed output, and wherein said selectively scanning comprises scanning the printed output at only the randomly selected pages.

3. The method of claim 2, wherein said selectively scanning further comprises scanning only a portion of the printed content of each page that is scanned, and wherein the portion of the printed content of each page that is scanned is less than the entire printed content of each page that is scanned.

4. The method of claim 1, wherein said selectively scanning comprises scanning only a portion of the printed content of each page that is scanned, and wherein the portion of the printed content of each page that is scanned is less than all of the entire printed content of each page that is scanned.

5. A computer program product, comprising a tangible computer readable storage medium having a computer readable instructions stored therein, wherein said instructions are configured to be executed by a computer of a data processing system to implement a method for real-time monitoring of remote printing operations, said method comprising:
    executing a first printing operation on a first print job via a printer, said printer being at a printing location that is remote from an end user submitting the printing request, said executing the first printing operation comprising said printer generating printed output consisting of a plurality of output pages for the first print job, each output page having printed content thereon;
    a scanner coupled to the printer selectively scanning the printed output with selectivity as to the output pages and/or the printed content on the output pages;
    evaluating a result of said selectively scanning with respect to an objective print standard;
    ascertaining from said evaluating that an unsatisfactory print quality of the printed output exists;
    responsive to said ascertaining, halting said executing the first printing operation; and
    notifying the end user of said halting;
    responsive to said halting, executing a second printing operation on a second print job via the printer and adjusting print parameters of the first print job to prevent a re-occurrence of the unsatisfactory print quality after said executing the first printing operation is subsequently resumed, wherein said executing the second printing operation and said adjusting print parameters of the first print job are performed concurrently;
    responsive to completion of said adjusting print parameters of the first print job, switching out said executing the second printing operation even though said executing the second printing operation has not been completed; and
    responsive to said switching out said executing the second printing operation, resuming said executing the first printing operation, wherein said resuming said executing the first printing operation comprises tagging the first print job to convey that the first print job had been previously halted.

6. The computer program product of claim 5, wherein the method further comprises randomly selecting pages of the printed output, and wherein said selectively scanning comprises scanning the printed output at only the randomly selected pages.

7. The computer program product of claim 6, wherein said selectively scanning further comprises scanning only a portion of the printed content of each page that is scanned, and wherein the portion of the printed content of each page that is scanned is less than all of the entire printed content of each page that is scanned.

8. The computer program product of claim 5, wherein said selectively scanning comprises scanning only a portion of the printed content of each page that is scanned, and wherein the portion of the printed content of each page that is scanned is less than all of the entire printed content of each page that is scanned.

9. A data processing system comprising a computer, a computer readable storage medium having a computer readable instructions stored therein, and a printer, wherein said instructions are configured to be executed by the computer to implement a method for real-time monitoring of remote printing operations, said method comprising:

executing a first printing operation on a first print job via a printer, said printer being at a printing location that is remote from an end user submitting the printing request, said executing the first printing operation comprising said printer generating printed output consisting of a plurality of output pages for the first print job, each output page having printed content thereon;

a scanner coupled to the printer selectively scanning the printed output with selectivity as to the output pages and/or the printed content on the output pages;

evaluating a result of said selectively scanning with respect to an objective print standard;

ascertaining from said evaluating that an unsatisfactory print quality of the printed output exists;

responsive to said ascertaining, halting said executing the first printing operation; and notifying the end user of said halting;

responsive to said halting, executing a second printing operation on a second print job via the printer and adjusting print parameters of the first print job to prevent a re-occurrence of the unsatisfactory print quality after said executing the first printing operation is subsequently resumed, wherein said executing the second printing operation and said adjusting print parameters of the first print job are performed concurrently;

responsive to completion of said adjusting print parameters of the first print job, switching out said executing the second printing operation even though said executing the second printing operation has not been completed; and responsive to said switching out said executing the second printing operation, resuming said executing the first printing operation, wherein said resuming said executing the first printing operation comprises tagging the first print job to convey that the first print job had been previously halted.

10. The system of claim 9, wherein the method further comprises randomly selecting pages of the printed output, and wherein said selectively scanning comprises scanning the printed output at only the randomly selected pages.

11. The system of claim 10, wherein said selectively scanning further comprises scanning only a portion of the printed content of each page that is scanned, and wherein the portion of the printed content of each page that is scanned is less than all of the entire printed content of each page that is scanned.

12. The system of claim 9, wherein said selectively scanning comprises scanning only a portion of the printed content of each page that is scanned, and wherein the portion of the printed content of each page that is scanned is less than all of the entire printed content of each page that is scanned.

* * * * *